(12) United States Patent
Saito et al.

(10) Patent No.: US 8,917,450 B2
(45) Date of Patent: Dec. 23, 2014

(54) LIGHT FILTER, MANUFACTURING METHOD OF LIGHT FILTER, AND OPTICAL DEVICE

(75) Inventors: Daisuke Saito, Matsumoto (JP); Tomoki Sakashita, Chino (JP)

(73) Assignee: Seiko Epson Corporation (JP)

( * ) Notice: Subject to any disclaimer, the term of this patent is extended or adjusted under 35 U.S.C. 154(b) by 560 days.

(21) Appl. No.: 13/285,670

(22) Filed: Oct. 31, 2011

(65) Prior Publication Data

US 2012/0105991 A1   May 3, 2012

(30) Foreign Application Priority Data

Nov. 2, 2010   (JP) .................................. 2010-245979

(51) Int. Cl.
*G02B 26/00* (2006.01)
*G02B 5/28* (2006.01)

(52) U.S. Cl.
CPC .............. *G02B 5/284* (2013.01); *G02B 26/001* (2013.01)
USPC ....................................................... 359/578

(58) Field of Classification Search
CPC ................. G02B 5/284; G02B 26/00–26/008; G02B 6/293–6/2938; G01J 3/26
USPC ................... 359/489.19, 370–371, 359–360, 359/577–590, 722–723, 890, 892; 356/450–521
See application file for complete search history.

(56) References Cited

U.S. PATENT DOCUMENTS

| | | | | |
|---|---|---|---|---|
| 5,142,414 A * | 8/1992 | Koehler | ......................... | 359/578 |
| 6,665,076 B1 * | 12/2003 | Watterson et al. | ............ | 356/454 |
| 6,833,957 B2 * | 12/2004 | Sato | .............................. | 359/579 |
| 2004/0109250 A1 * | 6/2004 | Choi et al. | .................... | 359/883 |
| 2005/0111008 A1 * | 5/2005 | Murata | ......................... | 356/519 |
| 2006/0008200 A1 * | 1/2006 | Nakamura et al. | .............. | 385/15 |
| 2006/0054795 A1 * | 3/2006 | Cole et al. | .................... | 250/226 |
| 2007/0171530 A1 * | 7/2007 | Nakamura | .................... | 359/580 |
| 2007/0279730 A1 * | 12/2007 | Heald | ........................... | 359/291 |
| 2008/0278788 A1 * | 11/2008 | Sasagawa | ..................... | 359/224 |

FOREIGN PATENT DOCUMENTS

| | | |
|---|---|---|
| JP | 2009-134028 | 6/2009 |
| JP | 2009-139601 | 6/2009 |

* cited by examiner

*Primary Examiner* — Stephone B Allen
*Assistant Examiner* — Jeffrey Madonna
(74) *Attorney, Agent, or Firm* — Harness, Dickey & Pierce, P.L.C.

(57) ABSTRACT

A light filter includes a first substrate, a second substrate, a first bonding film provided in an entire region at the second substrate side of the first substrate, a second bonding film provided in an entire region at the first substrate side of the second substrate, a first optical film provided on the first bonding film of the first substrate, a second optical film provided on the second bonding film of the second substrate, a first electrode provided on the first bonding film of the first substrate, and a second electrode provided on the second bonding film of the second substrate, and the first substrate and the second substrate are fixed by bonding of the first bonding film and the second bonding film, and the first optical film, the second optical film, the first electrode, and the second electrode are formed of the same material.

17 Claims, 10 Drawing Sheets

LIGHT FILTER, MANUFACTURING METHOD OF LIGHT FILTER, AND OPTICAL DEVICE

BACKGROUND

1. Technical Field

The present invention relates to a light filter, a manufacturing method of the light filter, and an optical device.

2. Related Art

In related art, for example, as disclosed in Patent Document 1 (JP-A-2009-134028), a light filter including a Fabry-Perot etalon filter having a pair of optical films opposed via a predetermined gap (hereinafter, may be referred to as "etalon filter", or simply as "etalon") is known.

The etalon filter described in Patent Document 1 has a first substrate and a second substrate held in parallel to each other, a first optical film (first reflection film) formed on the first substrate, and a second optical film (second reflection film) formed on the second substrate and opposed to the first optical film with a predetermined gap. The respective first optical film and second optical film form mirrors and may transmit only light in a predetermined wavelength range in response to the length of the gap (the amount of the gap) by multiple interference of light between the mirrors. Further, by variably controlling the amount of the gap, the wavelength range of light to be transmitted through may be shifted.

Furthermore, in the etalon filter described in Patent Document 1, bonding films containing a siloxane (Si—O) bind are used for bonding between the first substrate and the second substrate. The accuracy of wavelength separation in the etalon filter has a deep relationship with the accuracy of the amount of the gap. Therefore, to improve performance and quality of the etalon filter, it is necessary to control the length of the gap between the first optical film and the second optical film with stability and high accuracy.

However, in the etalon filter described in Patent Document 1, for bonding the respective substrates using the bonding films, for example, it is necessary to activate the bonding films formed on the respective substrates by ultraviolet radiation, oxygen plasma treatment, or the like, perform alignment of the respective substrates, and then, apply loads on the respective substrates, and the substrates may be slightly slanted and parallelism of the optical films may be difficult to be ensured at these steps.

As a cause of slanting of the substrates, for example, there is misalignment when the bonding films are partially formed on the respective substrates (bonding film misalignment) and substrate misalignment at the step of bonding the respective substrates to each other. Further, inclination, rounding, or the like is easily formed in the edge parts of the bonding films, and this also causes the slanting of the substrates.

For the slanting of the substrates, the applicant has tried to ensure the parallelism between the optical films provided on the respective substrates by forming the bonding films on the entire surfaces of the substrates and suppressing the slanting of the substrates, and has achieved some positive results.

However, damage may occur on the bonding films at the post process of forming and patterning electrodes and optical films for variable control of the amount of the gap, and gap stability between the optical films may not be ensured. That is, there has been a problem that it is difficult to constantly ensure stable quality. It has been estimated that the cause of the damage of the bonding films is that, after formation of the bonding films, patterning is respectively performed for forming the electrodes and the optical films.

SUMMARY

An advantage of some aspects of the invention is to solve at least a part of the problems described above and the invention can be implemented as the following forms or application examples.

APPLICATION EXAMPLE 1

This application example is directed to a light filter including a first substrate having a support part, a second substrate supported by the support part, a first bonding film provided in an entire region at the second substrate side of the first substrate, a second bonding film provided in an entire region at the first substrate side of the second substrate, a first optical film provided on the first bonding film of the first substrate, a second optical film provided on the second bonding film of the second substrate and oppositely placed to the first optical film, a first electrode provided on the first bonding film of the first substrate, and a second electrode provided on the second bonding film of the second substrate and oppositely placed to the first electrode, wherein the first substrate and the second substrate are fixed by bonding of the first bonding film and the second bonding film in the support part, and the first optical film, the second optical film, the first electrode, and the second electrode are formed using the same material.

According to this application example, since the first bonding film is provided in the entire region at the second substrate side of the first substrate and the second bonding film is provided in the entire region at the first substrate side of the second substrate, by contact between flat surfaces of the first bonding film and the second bonding film, the support part of the first substrate stably supports the second substrate, and slanting of the substrates may be suppressed. Thereby, a micro gap between the first optical film and the second optical film may be realized with high accuracy.

Further, since the first optical film, the second optical film, the first electrode, and the second electrode are formed using the same material, patterning is necessary only once, and deterioration of the first bonding film and the second bonding film due to etching of resists and films may be suppressed. Thereby, the micro gap between the first optical film and the second optical film may be constantly ensured with stable quality.

APPLICATION EXAMPLE 2

In the optical filter according to the above described application example, it is preferable that a first wiring line connecting the first optical film and the first electrode is provided on the first substrate.

APPLICATION EXAMPLE 3

In the optical filter according to the above described application example, it is preferable that a second wiring line connecting the second optical film and the second electrode is provided on the second substrate.

According to these application examples, since the first optical film and the first electrode are electrically connected and the second optical film and the second electrode are electrically connected, charge accumulation (charging) in the first optical film and the second optical film may be suppressed. Thereby, contact between the first optical film and the second optical film may be prevented.

APPLICATION EXAMPLE 4

In the optical filter according to the above described application example, it is preferable that a material of the first optical film, the second optical film, the first electrode, the second electrode, the first wiring line, and the second wiring line is any one of silver (Ag) alloy, silver (Ag), aluminum (Al), chromium (Cr), copper (Cu), nickel (Ni), platinum (Pt), and rhodium (Rh).

According to the application example, since the material has reflectivity and transmissibility to light and low resistance, even a small amount of light may be reflected or transmitted and the gap between the first optical film and the second optical film may be controlled with high accuracy in a wide range. Thereby, only lights in a predetermined wavelength range may be transmitted with high resolution in a wide wavelength range.

APPLICATION EXAMPLE 5

In the optical filter according to the above described application example, it is preferable that a material of the first optical film, the second optical film, the first electrode, the second electrode, the first wiring line, and the second wiring line is an alloy formed by selecting two or more kinds of materials of silver (Ag) alloy, silver (Ag), aluminum (Al), chromium (Cr), copper (Cu), nickel (Ni), platinum (Pt), and rhodium (Rh).

According to the application example, since the material advantageous in high-temperature resistance and process resistance is added to the material having reflectivity and transmissibility to light and low resistance, deterioration of the first optical film, the second optical film, the first electrode, the second electrode, the first wiring line, and the second wiring line may be suppressed. Thereby, performance of transmitting only lights in a predetermined wavelength range with high resolution in a wide wavelength range may be constantly ensured with stable quality. Note that the process resistance here refers to resistance to the respective step conditions in the patterning process performed when the optical films, electrodes, wiring lines after film formation are patterned in desired shapes, for example.

APPLICATION EXAMPLE 6

In the optical filter according to the above described application example, it is preferable that a concave part is provided at the second substrate side of the first substrate, a convex part projecting from a bottom surface of the concave part is provided in the concave part, and the convex part is provided in an island shape in the concave part, and a sectional shape as a section in a thickness direction of the first substrate in the convex part takes a trapezoidal shape with the bottom surface of the concave part as a lower base.

According to the application example, since the side surface of the convex part is inclined and the first wiring line is formed in a uniform thickness over the bottom surface of the concave part, the inclined surface of the convex part, and the surface of the convex part, disconnection of the wiring line may be suppressed. Thereby, the first wiring line may be formed with stable quality.

APPLICATION EXAMPLE 7

An optical device according to this application example is preferably a light filter including any one of the above described light filters.

According to the application example, since the first bonding film is provided in the entire region at the second substrate side of the first substrate and the second bonding film is provided in the entire region at the first substrate side of the second substrate, by contact between the flat surfaces of the first bonding film and the second bonding film, the support part of the first substrate stably supports the second substrate, and slanting of the substrates may be suppressed. Thereby, a micro gap between the first optical film and the second optical film may be realized with high accuracy.

Further, since the first optical film, the second optical film, the first electrode, and the second electrode are formed using the same material, patterning is necessary only once, and deterioration of the first bonding film and the second bonding film due to etching of resists and films may be suppressed. Thereby, the micro gap between the first optical film and the second optical film may be constantly ensured with stable quality. The optical device including the light filter may enjoy the same advantages.

APPLICATION EXAMPLE 8

This application example is directed to a manufacturing method of a light filter including a first substrate having a support part and a second substrate supported by the support part and formed by bonding a first bonding film formed in the support part and a second bonding film formed on the second substrate and fixing the first substrate and the second substrate. The method includes manufacturing a first substrate including forming a concave part with the support part of the first substrate as an outer periphery, forming an island-shaped convex part in the concave part, forming the first bonding film on a surface containing the support part, the concave part, and the convex part in the first substrate, forming a first optical film and a first electrode using the same material on the first bonding film, and activating the first bonding film, manufacturing a second substrate including forming the second bonding film on a surface of the second substrate, forming a second optical film and a second electrode using the same material on the second bonding film, and activating the second bonding film, and, on the first substrate and the second substrate, the first optical film and the second optical film of the support part opposed to each other, bonding the activated first bonding film and the activated second bonding film by applying a load on at least one of the first substrate and the second substrate, and thereby, fixing the first substrate and the second substrate.

According to the application example, the structure that "since the first bonding film is provided in the entire region at the second substrate side of the first substrate and the second bonding film is provided in the entire region at the first substrate side of the second substrate, by contact between flat surfaces of the first bonding film and the second bonding film, the support part of the first substrate stably supports the second substrate, and slanting of the substrates may be suppressed" that has been explained in application example 1 is realized.

Further, the structure that "since the first optical film, the second optical film, the first electrode, and the second electrode are formed using the same material, patterning is necessary only once, and deterioration of the first bonding film and the second bonding film due to etching of resists and films may be suppressed" that has been explained in application example 1 is realized.

APPLICATION EXAMPLE 9

In the manufacturing method of the optical filter according to the application example, it is preferable that, at the step of forming the first optical film and the first electrode on the first bonding film, a first wiring line connecting the first optical film and the first electrode is formed in the same step.

According to the application example, since the first optical film, the first electrode, and the first wiring line are formed together, the patterning is necessary only once. Thereby, the load applied to the first bonding film in the process of manufacturing the first substrate may be reduced. Further, the structure that "since the first optical film and the first electrode are electrically connected, charge accumulation (charging) in the first optical film may be suppressed" that has been explained in application example 2 is realized.

APPLICATION EXAMPLE 10

In the manufacturing method of the light filter according to the application example, it is preferable that, at the step of forming the second optical film and the second electrode on the second bonding film, a second wiring line connecting the second optical film and the second electrode is formed in the same step.

According to the application example, since the second optical film, the second electrode, and the second wiring line are formed together, the patterning is necessary only once. Thereby, the load applied to the second bonding film in the process of manufacturing the second substrate may be reduced. Further, the structure that "since the second optical film and the second electrode are electrically connected, charge accumulation (charging) in the second optical film may be suppressed" that has been explained in application example 3 is realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained with reference to the drawings. Note that, in the following respective drawings, for scaling the respective layers and the respective members in recognizable sizes, scales of the respective layers and the respective members are different from actual scales.

Embodiment 1

Figure 8:
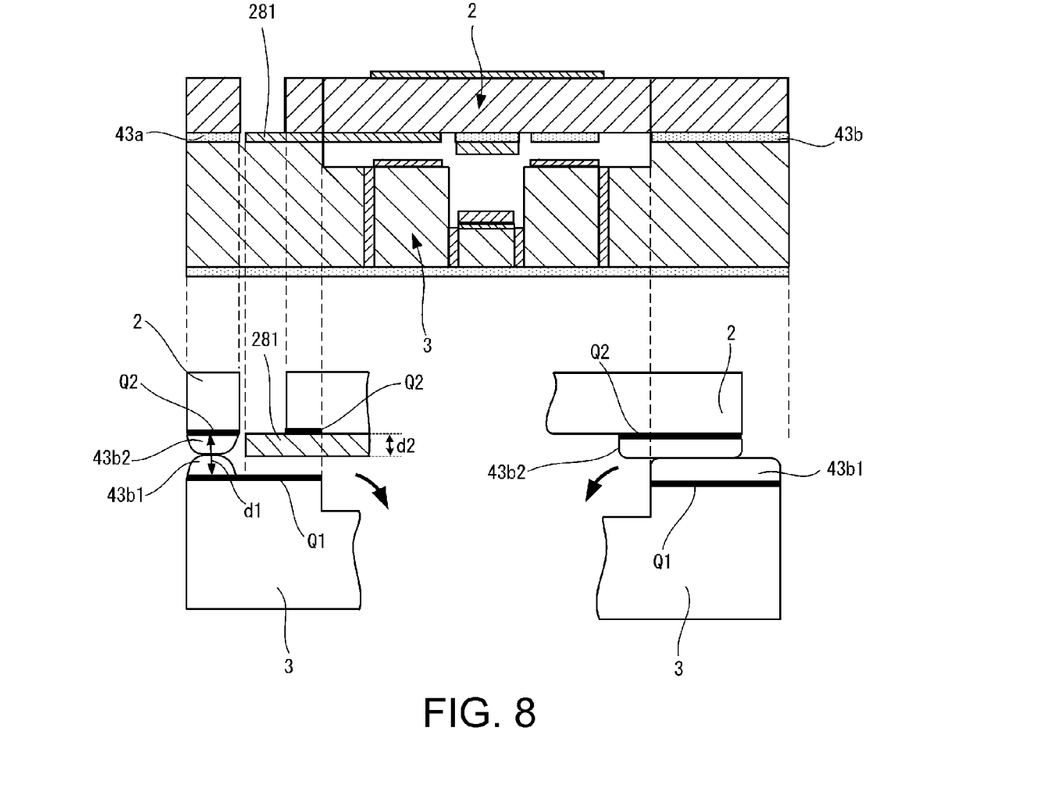
FIG. 8 shows a structure of an etalon filter in related art shown in FIG. 2 of Patent Document 1.

In the embodiment, an etalon filter as a light filter having a structure formed by bonding a first substrate and a second substrate will be explained. In the following explanation, the configuration of a related art example shown in FIG. 8 will be appropriately referred to and compared to an example of the embodiment. Note that the related art example shown in FIG. 8 is a related art example disclosed in FIG. 2 of Patent Document 1.

Figure 1:
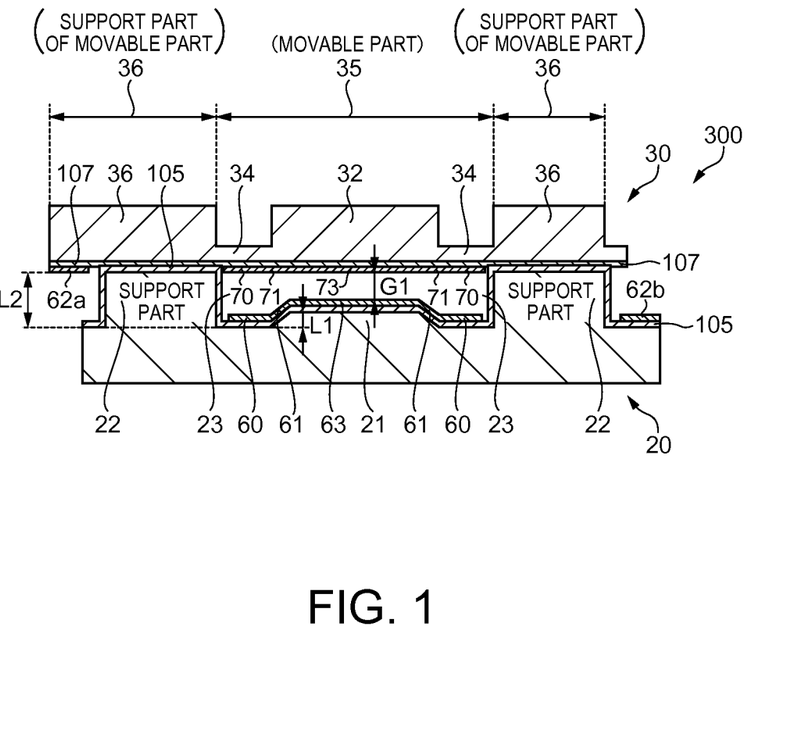
FIG. 1 is a sectional structure diagram of a variable-gap etalon filter that can variably control a gap between optical films according to embodiment 1.

FIG. 1 is a diagram for explanation of an etalon filter as a light filter having a structure formed by bonding a first substrate and a second substrate. In the following explanation, the etalon filter may be simply referred to as "etalon". In FIG. 1, a sectional structure of a variable-gap etalon filter that can variably control a gap between optical films according to the embodiment is shown. Note that this example is just an example, and an etalon filter with a fixed gap may be employed. In the following explanation, the variable-gap etalon filter may be simply referred to as "variable-gap etalon".

As shown in FIG. 1, a light filter 300 has a first substrate 20 and a second substrate 30 held in parallel to each other, a first optical film 63 provided on the first substrate 20, and a second optical film 73 formed on the second substrate 30. The first substrate 20 and the second substrate 30 are glass substrates having a transmissibility to light in a desired wavelength band, for example.

Further, the first optical film 63 and the second optical film 73 are formed to be opposed with a predetermined gap G1 in between. The first optical film 63 and the second optical film 73 have both reflectivity and transmissibility to light in desired wavelength bands, and the respective films form mirrors in the light filter 300.

The variable-gap etalon filter as a light filter shown in FIG. 1 has a structure formed by bonding the first substrate 20 having a support part 22 and the second substrate 30 supported by the support part 22. For fixing the first substrate 20 and the second substrate 30, a first bonding film 105 and a second bonding film 107 are used. As the first bonding film 105 and the second bonding film 107, films containing Si skeletons having siloxane bonds and leaving groups bound to the Si skeletons may be used. By utilizing the siloxane bond, the first substrate 20 and the second substrate 30 may be strongly bonded.

The first substrate 20 has the support part 22, the first optical film (first reflection film) 63 formed at the center on the first bonding film 105 of the first substrate 20, a first electrode 60 provided around the first optical film 63, and a first wiring line 61 that electrically connects the first optical film 63 and the first electrode 60. The support part 22 may be formed by working the first substrate 20 itself. Further, the first substrate 20 has a concave part 23 and a convex part 21 projecting from the bottom surface of the concave part.

Further, the second substrate 30 has the second optical film (second reflection film) 73 formed at the center on the second bonding film 107 of the second substrate 30, a second electrode 70 provided around the second optical film 73, and a second wiring line 71 that electrically connects the second optical film 73 and the second electrode 70. The first electrode 60 and the second electrode 70 form an actuator that produces flexion of the second substrate 30 as a movable substrate for variably controlling the gap between the first optical film 63 and the second optical film 73.

In the embodiment, the second substrate 30 has a movable part 35 including a thin part (diaphragm part) 34, and a support part of movable part 36 that supports the movable part 35 and is thicker than the thin part 34. By the support part 22, the support part of movable part in the second substrate 30 is supported. The upper surface of the support part 22 is a support surface.

In the example shown in FIG. 1, the support part 22 is formed by a projection part projecting in the thickness direction of the first substrate 20 by a distance L2 with reference to the bottom surface of the concave part 23 provided on the first substrate 20. At the center of the first substrate 20, the convex part 21 projecting by a distance L1 with reference to the bottom surface of the concave part 23 is provided, and the first optical film 63 is formed on the convex part 21. Note that the distance L1 is set smaller than the distance L2.

In the example of FIG. 1, all of the upper surfaces, the edge parts, and the side surfaces of the support part (projection part) 22 are covered by the first bonding film 105. When the upper surface of the support part 22 is used as the support surface, the first bonding film 105 is provided in the entire region (entire surface) of the support surface of the support part 22. The surface of the first bonding film 105 (the surface at the second substrate 30 side) on the support surface of the support part 22 is a flat surface without difference in level, i.e., a planar surface.

Further, the surface at the first substrate 20 side of the support part of movable part 36 on the second substrate (i.e., the rear surface) is a supported surface. The supported surface may contain a misregistration margin region provided in the region actually supported by the support part 22 and near the region, which will be described later, for example. The supported surface has a flat surface like the support surface of the support part 22. The supported surface of the second substrate 30 may be referred to as "a flat surface as a surface to be supported by the support part 22 in design, containing a surface actually supported by the support part 22", for example.

In the example shown in FIG. 1, the second bonding film 107 is provided in the entire region (entire surface) of the supported surface in the second substrate 30. Thereby, the second substrate 30 may be stably supported on the first substrate 20, and slanting of the second substrate 30 may be suppressed.

The gap G1 between the first optical film 63 provided on the first bonding film 105 of the first substrate 20 and the second optical film 73 provided on the second bonding film 107 of the second substrate 30 is set to about 100 nm, for example, and accordingly, gap control with extremely high accuracy is necessary. To realize the highly accurate gap control, it is important to ensure parallelism between surfaces opposed to each other (opposed surfaces) of the respective optical films 63, 73 with high accuracy. According to the example shown in FIG. 1, the horizontally held respective substrates 20, 30 may be bonded while the parallelism is maintained as it is, and accordingly, the micro gap G1 between the first optical film 63 and the second optical film 73 may be realized with high accuracy.

Here, an example of FIG. 8 is referred to as a comparative example. FIG. 8 shows a structure of an etalon filter in related art shown in FIG. 2 of Patent Document 1.

In the related art example shown in FIG. 8, an upper substrate 2 and a lower substrate 3 are bonded via bonding films 43b1, 43b2. Further, on the upper substrate 2, a lead electrode 281 is provided.

The first bonding film 43b1 and the second bonding film 43b2 are partially formed on the substrates 3, 2, respectively. It is clear that, compared to the support structure that supports the upper substrate 2, the support structure of the embodiment shown in FIG. 1 may support the upper substrate more stably. In the support structure of the embodiment shown in FIG. 1, the second substrate 30 (support part of movable part 36) is supported by utilizing the entire surface on the support surface of the support part 22 and the second substrate 30 is stably supported on the support surface by the contact between the flat surfaces of the respective bonding films 105, 107, and thereby, slanting of the second substrate 30 is hard to occur.

Returning to FIG. 1, the explanation of the embodiment will continue. As has been explained using the example of FIG. 1, it is preferable that the second substrate 30 is supported utilizing the entire surface on the support surface in the support part 22 and the second substrate 30 is stably supported on the support surface by the contact between the flat surfaces of the respective bonding films 105, 107.

In the actual manufacture of the light filter 300, for example, pattern misalignment when the respective bonding films 105, 107 are formed and misalignment between the substrates 20, 30 may occur. However, even when the misalignment occurs, the stable substrate support structure may be ensured because the second bonding film 107 is provided in the entire region (entire surface) of the supported surface in the second substrate 30 as shown in FIG. 1.

As described above, even when misalignment occurs, the second substrate 30 can be stably supported on the support part 22 without being slanted by employment of the light filter 300 in consideration of the misregistration margin as shown in FIG. 1.

Figure 2A:
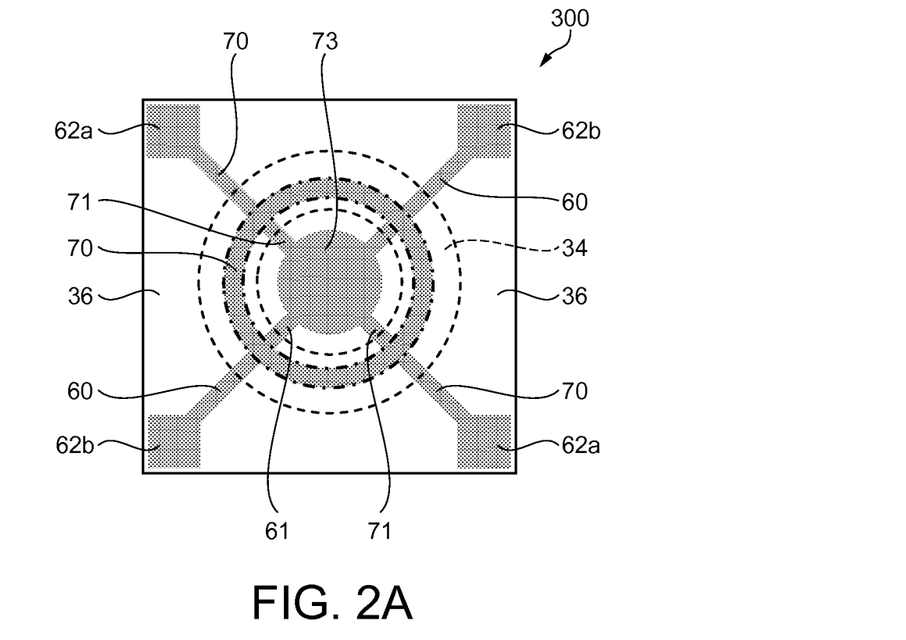
FIGS. 2A and 2B are a plan view and a sectional structure diagram seen from a thickness direction of a second substrate of the variable-gap etalon filter that can variably control the gap between the optical films according to embodiment 1.
Figure 2B:
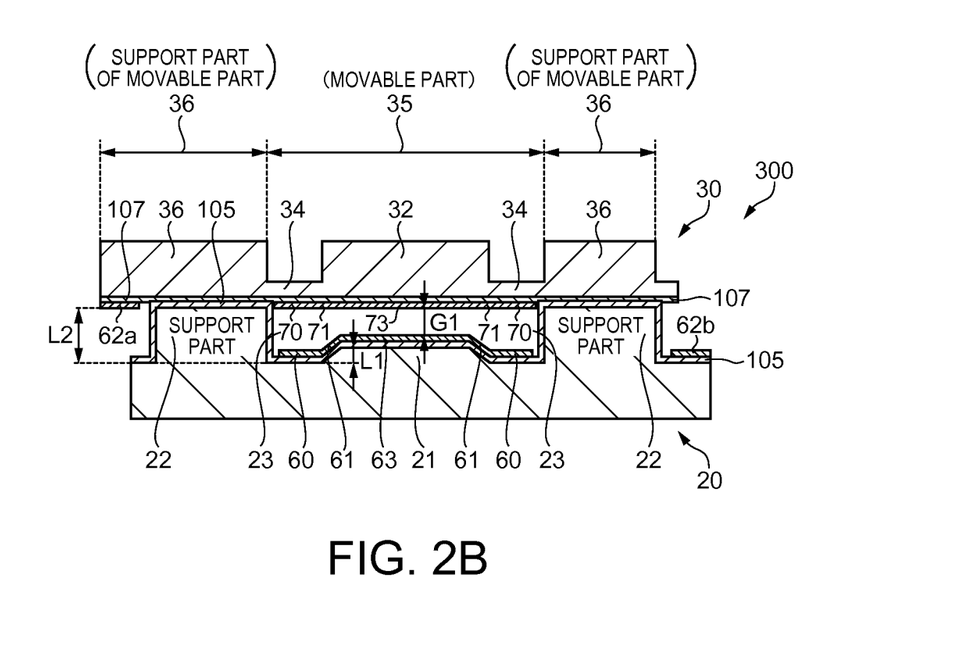

FIGS. 2A and 2B are diagrams for explanation of configurations of optical films, electrodes, wiring lines of the variable-gap etalon filter as the light filter having the structure formed by bonding the first substrate and the second substrate. FIG. 2A is a plan view seen from the thickness direction of the second substrate of the variable-gap etalon filter that can variably control the gap between the optical films according to the embodiment, and FIG. 2B is a sectional view showing a sectional structure.

In FIGS. 2A and 2B, the first substrate 20 has the support part 22, the first optical film (first reflection film) 63 formed at the center on the first bonding film 105 of the first substrate 20, the first electrode 60 provided around the first optical film 63, and the first wiring line 61 that electrically connects the first optical film 63 and the first electrode 60. The support part 22 may be formed by working the first substrate 20 itself. Further, the first substrate 20 has the concave part 23 and the convex part 21 projecting from the bottom surface of the concave part.

Further, the second substrate 30 has the second optical film (second reflection film) 73 formed at the center on the second bonding film 107 of the second substrate 30, the second electrode 70 provided around the second optical film 73, and the second wiring line 71 that electrically connects the second optical film 73 and the second electrode 70. The first electrode 60 and the second electrode 70 form the actuator that produces flexion of the second substrate 30 as the movable substrate for variably controlling the gap between the first optical film 63 and the second optical film 73.

In the example shown in FIGS. 2A and 2B, the first optical film 63, the first electrode 60, the first wiring line 61, the second optical film 73, the second electrode 70, and the second wiring line 71 are formed using the same material.

The first optical film 63, the first electrode 60, the first wiring line 61, the second optical film 73, the second electrode 70, and the second wiring line 71 are formed using a silver (Ag) alloy, for example.

The concave part 23 is provided at the second substrate 30 side of the first substrate 20, the concave part 23 has the convex part 21 projecting from the bottom surface of the concave part 23, the convex part 21 is provided in an island shape in the concave part 23, and the sectional shape of the convex part 21 takes a trapezoidal shape with the bottom surface of the concave part 23 as a lower base.

When the materials of the first optical film 63, the first electrode 60, the second optical film 73, and the second electrode 70 are different, two patterning steps emerge. Thereby, due to etching of resists and films at the two patterning steps, the first bonding film 105 and the second bonding film 107 are damaged and deteriorated, and strong bonding strength is difficult to be obtained.

Occurrence of initial charge accumulation (charging) of the first optical film 63 and the second optical film 73 and charge accumulation (charging) due to variable control of the gap between the first optical film 63 and the second optical film 73 of the variable-gap etalon filter leads to contact between the first optical film 63 and the second optical film 73 and reduction of gap control accuracy.

On the other hand, in the example shown in FIGS. 2A and 2B, the first optical film 63, the first electrode 60, the first wiring line 61, the second optical film 73, the second electrode 70, and the second wiring line 71 are provided and they are formed using the same material. Accordingly, patterning is necessary only once, and deterioration of the first bonding film 105 and the second bonding film 107 due to etching of resists and films may be suppressed.

Since the first optical film 63 and the first electrode 60 are electrically connected and the second optical film 73 and the second electrode 70 are electrically connected, the charge accumulation (charging) in the first optical film 63 and the second optical film 73 may be suppressed. Thereby, the contact between the first optical film 63 and the second optical film 73 and the reduction of the gap control accuracy may be prevented.

However, a material having reflectivity and transmissibility to light is desired for the first optical film 63 and the second optical film 73, and a material having low resistance is desired for the first electrode 60, the second electrode 70, the first wiring line 61, and the second wiring line 71. Accordingly, a material having these properties is necessary.

In the case where the first optical film 63, the first electrode 60, and the first wiring line 61 have thicknesses equal to or less than 50 nm, when the side surface of the convex part 21 of the first substrate 20 is formed perpendicularly to the bottom surface of the concave part 23, it is difficult to form the first wiring line 61 on the side surface of the convex part 21 with stable quality and disconnection of the first wiring line 61 is caused.

On the other hand, in the example shown in FIGS. 2A and 2B, the first optical film 63, the first electrode 60, the first wiring line 61, the second optical film 73, the second electrode 70, and the second wiring line 71 are formed using a silver (Ag) alloy, for example. Accordingly, for example, when the thicknesses are about 50 nm, reflectivity and transmissibility may be provided and also low resistance may be realized.

Not only the silver (Ag) alloy but also any one of silver (Ag), aluminum (Al), chromium (Cr), copper (Cu), nickel (Ni), platinum (Pt), and rhodium (Rh) or an alloy thereof may be applied.

The concave part 23 is provided at the second substrate 30 side of the first substrate 20, the concave part 23 has the convex part 21 projecting from the bottom surface of the concave part 23, the convex part 21 is provided in an island shape in the concave part 23, and the sectional shape of the convex part 21 takes a trapezoidal shape with the bottom surface of the concave part 23 as a lower base. Accordingly, the side surface of the convex part 21 is inclined and the first wiring line 61 is formed in a uniform thickness over the bottom surface of the concave part 23, the inclined surface of the convex part 21, and the surface of the convex part 21, and thereby, disconnection of the first wiring line 61 may be suppressed.

As described above, according to the light filter 300 according to the embodiment, the following advantages may be obtained.

Since the first bonding film 105 is provided in the entire region at the second substrate 30 side of the first substrate 20 and the second bonding film 107 is provided in the entire region at the first substrate 20 side of the second substrate 30, the support part 22 of the first substrate 20 may stably support the second substrate 30 and slanting of the substrates may be suppressed because of the contact between the flat surfaces of the first bonding film 105 and the second bonding film 107. Thereby, the micro gap between the first optical film 63 and the second optical film 73 may be realized with high accuracy.

Further, since the first optical film. 63, the second optical film 73, the first electrode 60, and the second electrode 70 have the same material quality, patterning is necessary only once and deterioration of the first bonding film 105 and the second bonding film 107 due to etching of resists and films may be suppressed. Thereby, the micro gap between the first optical film 63 and the second optical film 73 may be constantly ensured with stable quality.

Embodiment 2

In the embodiment, a manufacturing method of the variable-gap etalon filter as the light filter will be explained. FIGS. 2A and 2B shows a plan view and a sectional structure seen from the thickness direction of the second substrate 30 of the completed variable-gap etalon filter. The structure of the variable-gap etalon filter shown in FIGS. 2A and 2B is the same as the structure of the variable-gap etalon filter shown in FIG. 1.

That is, in the variable-gap etalon shown in FIGS. 2A and 2B, the second bonding film 107 is provided in the entire region (entire surface) on the second substrate at the first substrate 20 side of the second substrate 30. Further, the first bonding film 105 is provided in the entire region (entire surface) on the first substrate at the second substrate 30 side of the first substrate 20. Note that, in FIGS. 2A and 2B, the same reference signs are assigned to the parts in common with the forecited drawings. As below, an example of the manufacturing method of the variable-gap etalon filter shown in FIGS. 2A and 2B will be explained using FIGS. 3A to 3H.

FIGS. 3A to 3H show an example of a manufacturing process of the second substrate before bonding. First, at a step shown in FIG. 3A, for example, both sides of a synthetic quartz glass substrate are mirror-polished, and a glass substrate 31 having a thickness of 200 µm, for example, is fabricated. At a step of FIG. 3B, on both sides of the glass substrate 31, chromium (Cr) films having thicknesses of 50 nm are formed and gold (Au) films having thicknesses of 500 nm are formed on the Cr films. At a step shown in FIG. 3C, resists (not shown) are applied to both sides of the glass substrate 31, and the resists are patterned and resist masks are formed. Then, using the resist masks, Au/Cr films are patterned. That is, the Au films are etched using mixture of iodine and potassium iodide, and the Cr films are etched using an aqueous solution of cerium ammonium nitrate.

Figure 3A:
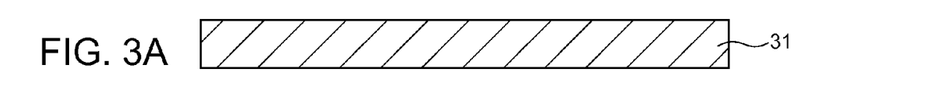
FIGS. 3A to 3H show an example of a manufacturing process of a second substrate before bonding according to embodiment 2.
Figure 3B:
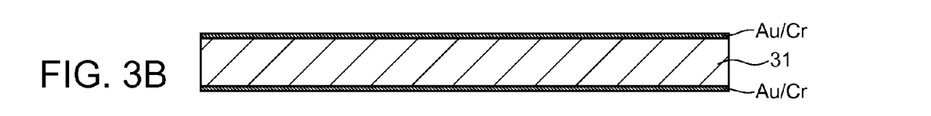
Figure 3C:
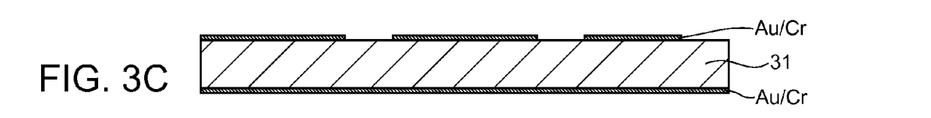
Figure 3D:
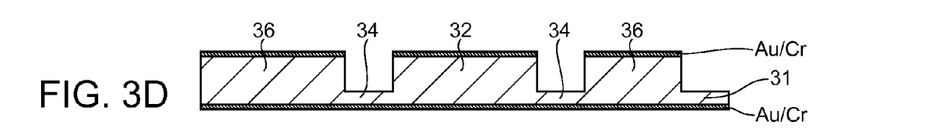
Figure 3E:
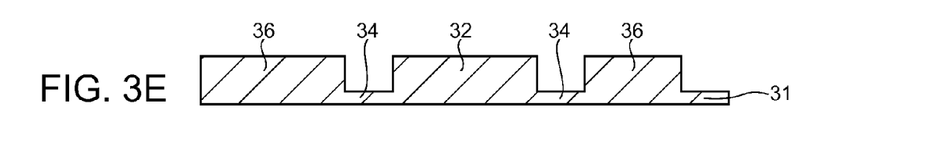

At a step shown in FIG. 3D, the glass substrate 31 is dipped in an aqueous solution of hydrofluoric acid, and the glass substrate 31 is etched by about 150 µm in the formation regions of the thin part (diaphragm part) 34 and electrode lead grooves (not shown). Thereby, the thickness of the glass substrate 31 after etching in the formation regions of the thin part (diaphragm part) 34 and the electrode lead grooves (not shown) is about 50 µm. At a step shown in FIG. 3E, the resists (not shown) and the Au/Cr films attached to the surfaces of the glass substrate 31 are respectively removed.

Figure 3F:
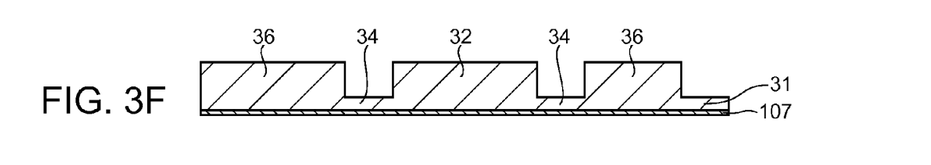

At a step shown in FIG. 3F, in the entire region (entire surface) on the glass substrate 31 at the side bonded to the first substrate of the glass substrate 31, a plasma-polymerized film (for example, a film consisting primarily of polyorganosiloxane) as the second bonding film 107 is formed by the plasma CVD method. The thickness of the second bonding film 107 is 100 nm, for example.

Figure 3G:
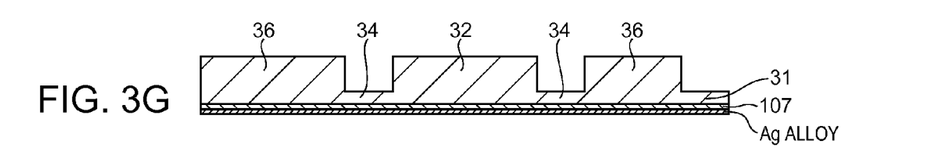
Figure 3H:
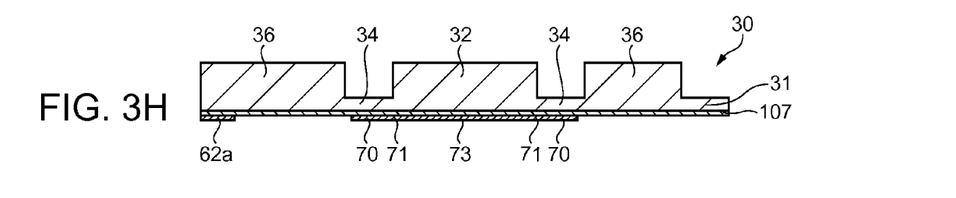

At a step shown in FIG. 3G, on the second bonding film 107, as a material film for the second optical film (second reflection film), the second electrode, and the second wiring line, for example, a silver (Ag) alloy film is formed in a thickness of 50 nm using sputtering. At a step shown in FIG. 3H, a resist (not shown) is applied thereon, the resist is patterned, and then, the silver (Ag) alloy film is etched using an aqueous solution containing phosphoric acid, nitric acid, and acetic acid. As a result, the second optical film 73 (second reflection film), the second electrode 70, and the second wiring line 71 are formed together. Then, the resist (not shown) is removed. Note that, as the material film for the optical film, the electrode, and the wiring line, any one of silver (Ag), aluminum (Al), chromium (Cr), copper (Cu), nickel (Ni), platinum (Pt), and rhodium (Rh) or an alloy thereof may be applied.

Here, as a comparative example, an example of FIGS. 9A to 9J is referred to. FIGS. 9A to 9J show an example of a manufacturing process of the second substrate before bonding in a variable-gap etalon filter in which the applicant has achieved some positive results by providing the second bonding film in the entire region (entire surface) on the second substrate at the side bonded to the first substrate of the second substrate to suppress slanting of the glass substrates and ensuring parallelism between the optical films provided on the respective substrates.

Figure 9A:
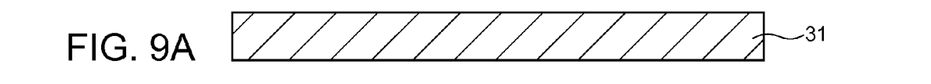
FIGS. 9A to 9J show an example of a manufacturing process of a second substrate before bonding in a variable-gap etalon filter as a comparative example.
Figure 9B:
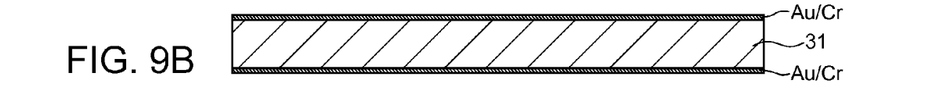
Figure 9C:
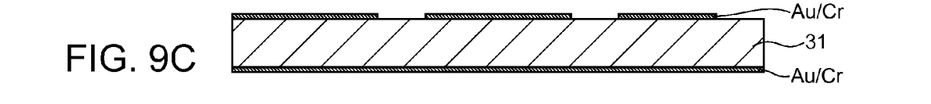

First, at a step shown in FIG. 9A, for example, both sides of a synthetic quartz glass substrate are mirror-polished, and a glass substrate 31 having a thickness of 200 µm, for example, is fabricated. At a step of FIG. 9B, on both sides of the glass substrate 31, chromium (Cr) films having thicknesses of 50 nm are formed and gold (Au) films having thicknesses of 500 nm are formed on the Cr films. At a step shown in FIG. 9C, resists (not shown) are applied to both sides of the glass substrate 31, and the resists are patterned and resist masks are formed. Then, using the resist masks, Au/Cr films are patterned. That is, the Au films are etched using mixture of iodine and potassium iodide, and the Cr films are etched using an aqueous solution of cerium ammonium nitrate.

Figure 9D:
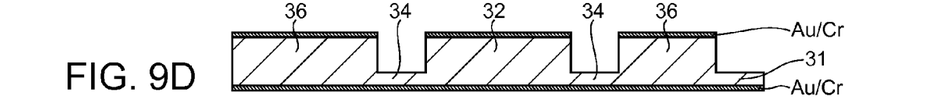
Figure 9E:
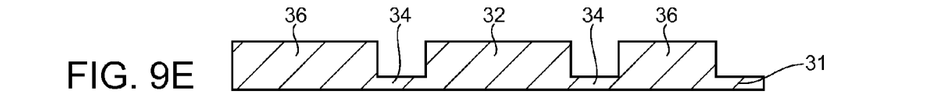

At a step shown in FIG. 9D, the glass substrate 31 is dipped in an aqueous solution of hydrofluoric acid, and the glass substrate 31 is etched by about 150 µm in the formation regions of the thin part (diaphragm part) 34 and electrode lead grooves (not shown). Thereby, the thickness of the glass substrate 31 after etching in the formation regions of the thin part (diaphragm part) 34 and the electrode lead grooves (not shown) is about 50 µm. At a step shown in FIG. 9E, the resists (not shown) and the Au/Cr films attached to the surfaces of the glass substrate 31 are respectively removed.

Figure 9F:
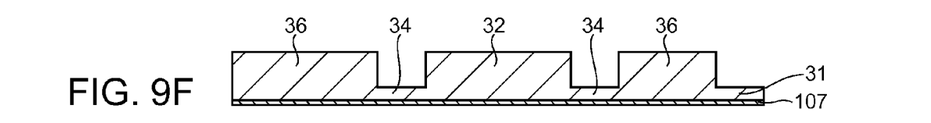

At a step shown in FIG. 9F, in the entire region (entire surface) on the glass substrate 31 at the side bonded to the first substrate of the glass substrate 31, a plasma-polymerized film (for example, a film consisting primarily of polyorganosiloxane) as the second bonding film 107 is formed by the plasma CVD method. The thickness of the second bonding film 107 is 100 nm, for example.

Figure 9G:
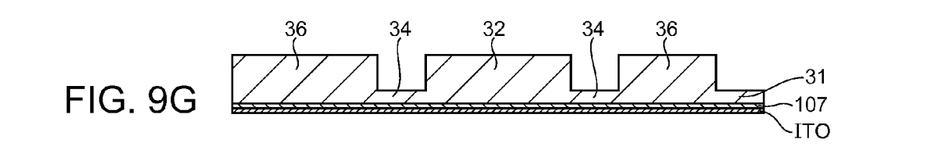
Figure 9H:
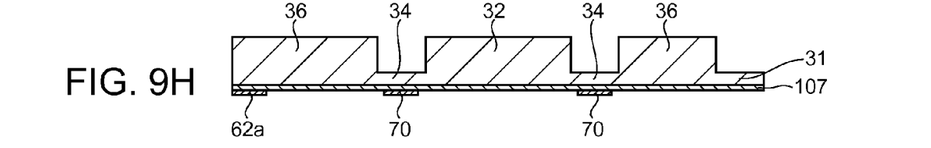

At a step shown in FIG. 9G, on the second bonding film 107, as a material film for the second electrode, for example, an ITO film is formed in a thickness of 0.1 µm using sputtering. At a step shown in FIG. 9H, a resist (not shown) is applied thereon, the resist is patterned, and then, the ITO film is etched using mixture of nitric acid and hydrochloric acid, for example. As a result, the second electrode 70 is formed. Then, the resist (not shown) is removed.

Figure 9I:
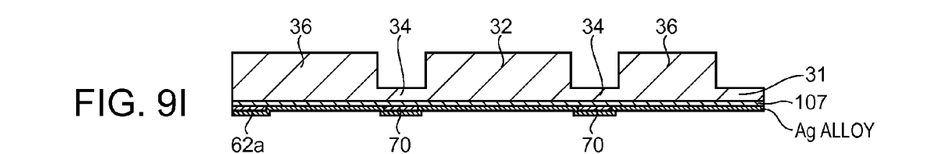
Figure 9J:
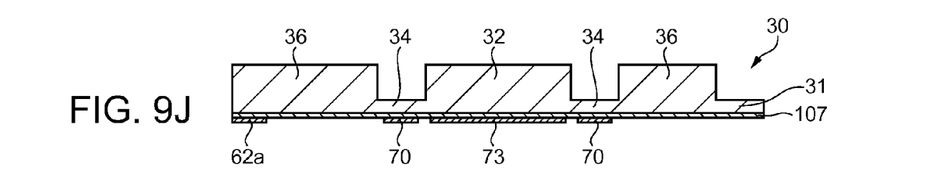

At a step of FIG. 9I, on the second bonding film 107 or the second electrode 70, as a material film for the second optical film (second reflection film), for example, a silver (Ag) alloy film is formed in a thickness of 50 nm using sputtering. At a step shown in FIG. 9J, a resist (not shown) is applied thereon, the resist is patterned, and then, the silver (Ag) alloy film is etched using an aqueous solution containing phosphoric acid, nitric acid, and acetic acid. As a result, the second optical film 73 (second reflection film) is formed. Then, the resist (not shown) is removed.

In the comparative example shown in FIGS. 9A to 9J, since the materials of the second electrode and the second optical film are different, material film formation and patterning are performed twice. On the other hand, in the example of the manufacturing process of the embodiment shown in FIGS. 3A to 3H, the materials of the second electrode and the second optical film are the same, and therefore, film formation and patterning are necessary only once. Accordingly, the load in the process of manufacturing the second substrate may be reduced.

Further, the structure that "since the second optical film and the second electrode are electrically connected (via the second wiring line), charge accumulation (charging) in the second optical film may be suppressed" is realized.

Next, an example of a manufacturing process of the first substrate before bonding will be explained. FIGS. 4A to 4E show an example of a manufacturing process of the first substrate before bonding.

Figure 4A:
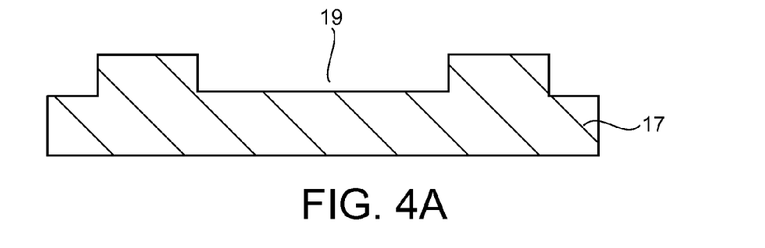
FIGS. 4A to 4E show an example of a manufacturing process of a first substrate before bonding according to embodiment 2.

First, at a step shown in FIG. 4A, both sides of a synthetic quartz glass substrate are mirror-polished, and a glass substrate 17 having a thickness of 500 µm is fabricated. Then, resists (not shown) are applied to both sides of the glass substrate 17, and the resists are patterned. Using the patterned resists as masks, the glass substrate 17 is selectively etched with an aqueous solution of hydrofluoric acid. Thereby, a recess part 19 is formed. The depth of the recess part is about 0.5 µm. Then, the resist mask is removed.

Figure 4B:
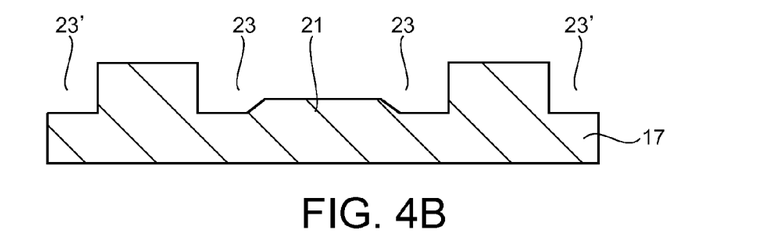

At a step shown in FIG. 4B, resists (not shown) are applied to both sides of the glass substrate 17, and the resists formed on the upper surface is patterned. Using the patterned resist as a mask, the glass substrate 17 is etched with an aqueous solution of hydrofluoric acid by 1 μm. Thereby, the concave part 23 for formation of the first electrode, a concave part 23' for an electrode lead part, and the slope of the convex part 21 side surface projecting from the bottom surface of the concave part 23 are formed. Then, the resist mask is removed.

Figure 4C:
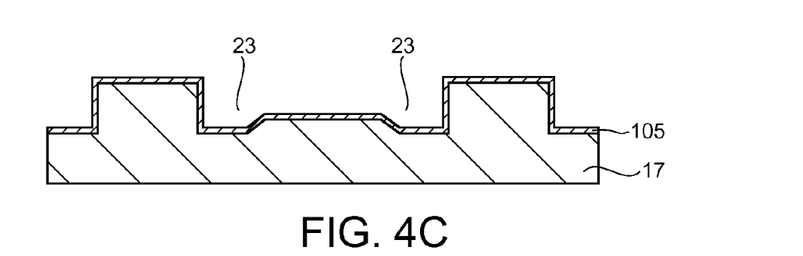

At a step shown in FIG. 4C, in the entire region (entire surface) on the glass substrate 17 at the side bonded to the second substrate of the glass substrate 17, a plasma-polymerized film (for example, a film consisting primarily of polyorganosiloxane) as the first bonding film 105 is formed by the plasma CVD method. The thickness of the first bonding film 105 is 100 nm, for example.

Figure 4D:
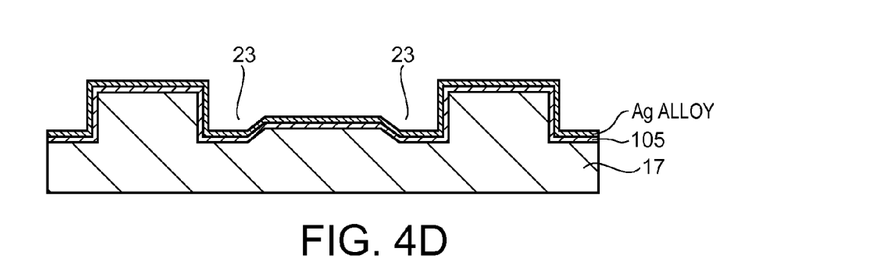
Figure 4E:
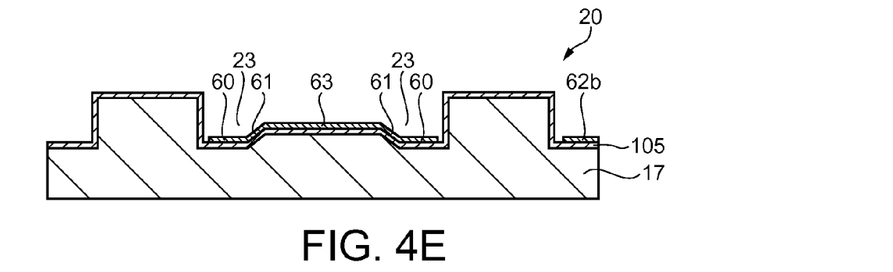

At a step shown in FIG. 4D, on the first bonding film 105, as a material film for the first optical film (first reflection film), the first electrode, and the first wiring line, for example, a silver (Ag) alloy film is formed in a thickness of 50 nm using sputtering. At a step shown in FIG. 4E, a resist (not shown) is applied thereon, the resist is patterned, and then, the silver (Ag) alloy film is etched using an aqueous solution containing phosphoric acid, nitric acid, and acetic acid. As a result, the first optical film (first reflection film) 63, the first electrode 60, and the first wiring line 61 are formed together. Then, the resist (not shown) is removed. Note that, as the material film for the optical film, the electrode, and the wiring line, any one of silver (Ag), aluminum (Al), chromium (Cr), copper (Cu), nickel (Ni), platinum (Pt), and rhodium (Rh) or an alloy thereof may be applied.

Here, as a comparative example, an example of FIGS. 10A to 11B is referred to. FIGS. 10A to 11B show an example of a manufacturing process of the first substrate before bonding in a variable-gap etalon filter in which the applicant has achieved some positive results by providing the first bonding film in the entire region (entire surface) on the first substrate at the side bonded to the second substrate of the first substrate to suppress slanting of the glass substrates and ensuring parallelism between the optical films provided on the respective substrates.

Figure 10A:
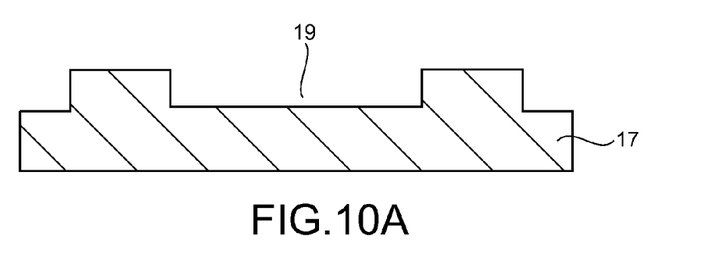
FIGS. 10A to 10E show an example of a manufacturing process of a first substrate before bonding in a variable-gap etalon filter as a comparative example.

First, at a step shown in FIG. 10A, both sides of a synthetic quartz glass substrate are mirror-polished, and a glass substrate 17 having a thickness of 500 μm is fabricated. Then, resists (not shown) are applied to both sides of the glass substrate 17, and the resists are patterned. Using the patterned resists as masks, the glass substrate 17 is selectively etched with an aqueous solution of hydrofluoric acid. Thereby, the recess part 19 is formed. The depth of the recess part is about 0.5 μm. Then, the resist mask is removed.

Figure 10B:
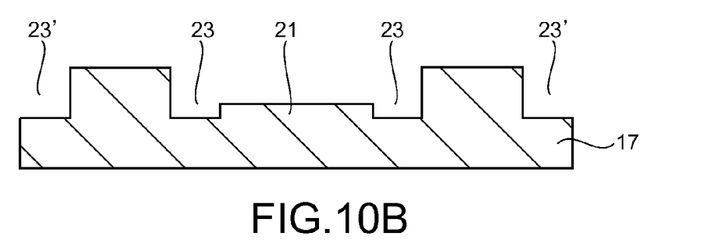

At a step of FIG. 10B, resists (not shown) are applied to both sides of the glass substrate 17, and the resist formed on the upper surface is patterned. Using the patterned resist as a mask, the glass substrate 17 is etched with an aqueous solution of hydrofluoric acid by 1 μm. Thereby, the concave part 23 for formation of the first electrode and the concave part 23' for the electrode lead part are formed. Then, the resist mask is removed.

Figure 10C:
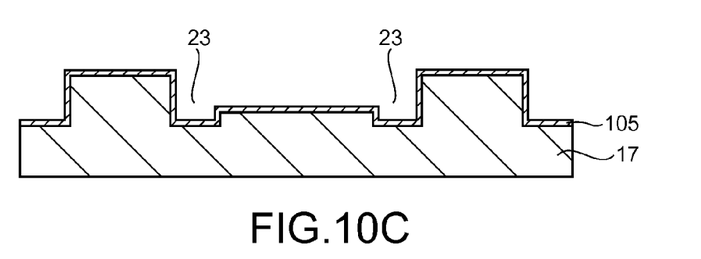

At a step of FIG. 10C, in the entire region (entire surface) on the glass substrate 17 at the side bonded to the second substrate of the glass substrate 17, a plasma-polymerized film (for example, a film consisting primarily of polyorganosiloxane) as the first bonding film 105 is formed by the plasma CVD method. The thickness of the first bonding film 105 is 100 nm, for example.

Figure 10D:
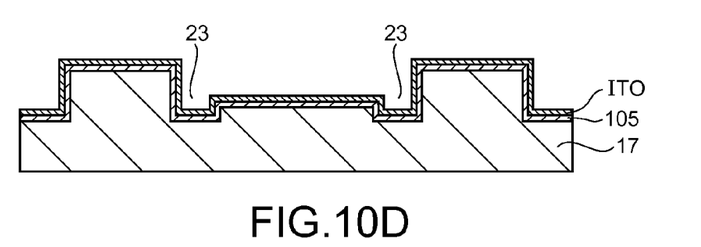
Figure 10E:
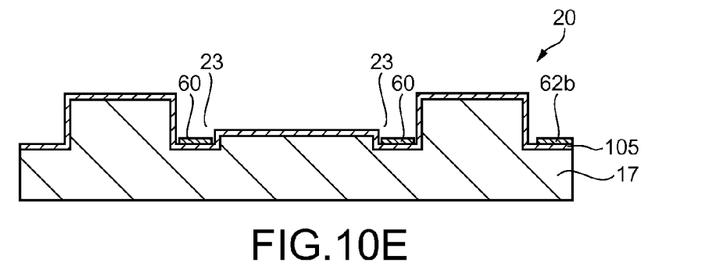

At a step of FIG. 10D, on the first bonding film 105, as a material film for the first electrode, for example, an ITO film is formed in a thickness of 0.1 μm using sputtering. At a step shown in FIG. 10E, a resist (not shown) is applied thereon, the resist is patterned, and then, the ITO film is etched using mixture of nitric acid and hydrochloric acid, for example. As a result, the first electrode 60 is formed. Then, the resist (not shown) is removed.

Figure 11A:
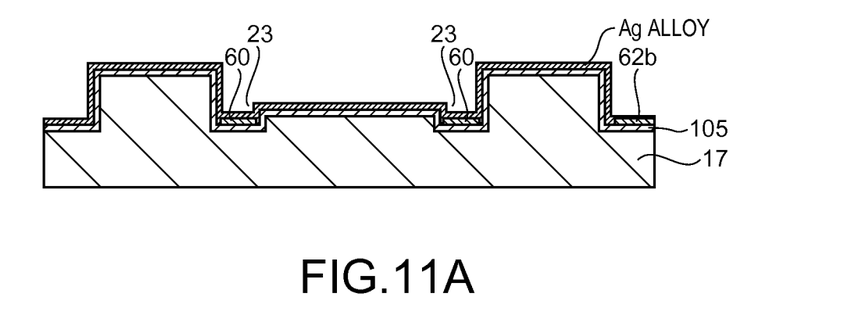
FIGS. 11A and 11B show an example of a manufacturing process of a first substrate before bonding in a variable-gap etalon filter as a comparative example.
Figure 11B:
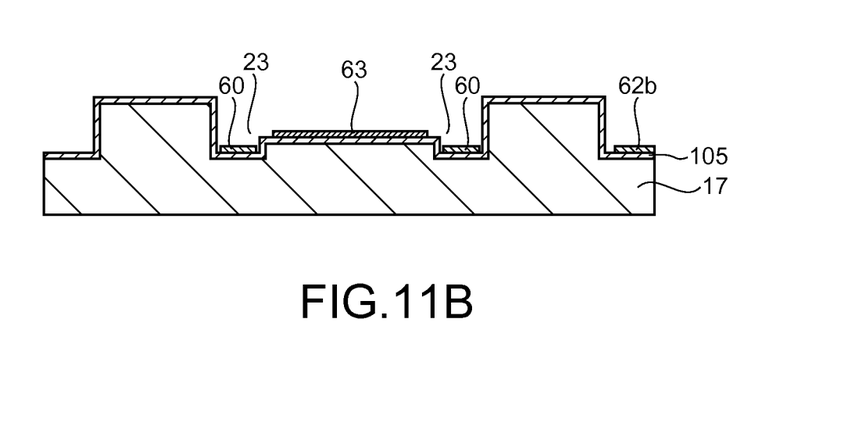

At a step of FIG. 11A, on the first bonding film 105 or the first electrode 60, as a material film for the first optical film (first reflection film), for example, a silver (Ag) alloy film is formed in a thickness of 50 nm using sputtering. At a step shown in FIG. 11B, a resist (not shown) is applied thereon, the resist is patterned, and then, the silver (Ag) alloy film is etched using an aqueous solution containing phosphoric acid, nitric acid, and acetic acid. As a result, the first optical film 63 (first reflection film) is formed. Then, the resist (not shown) is removed.

In the comparative example shown in FIGS. 10A to 11B, since the materials of the first electrode and the first optical film are different, material film formation and patterning are performed twice. On the other hand, in the example of the manufacturing process of the embodiment shown in FIGS. 4A to 4E, the materials of the first electrode and the first optical film are the same, and therefore, film formation and patterning are necessary only once. Accordingly, the load in the process of manufacturing the first substrate may be reduced.

Further, the structure that "since the first optical film and the first electrode are electrically connected (via the first wiring line), charge accumulation (charging) in the first optical film may be suppressed" is realized.

Figure 5A:
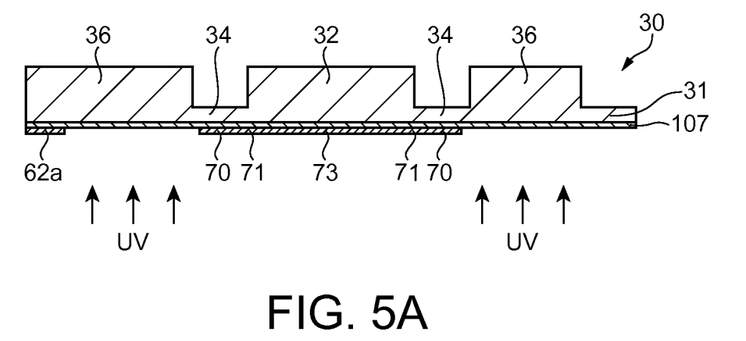
FIGS. 5A to 5C show an example of a bonding process of the first substrate and the second substrate according to embodiment 2.
Figure 5B:
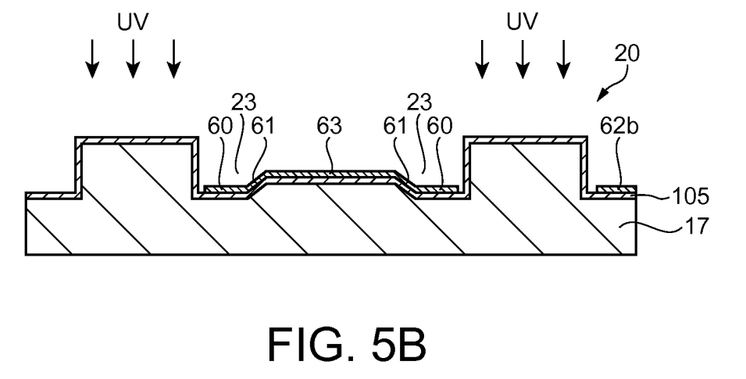
Figure 5C:
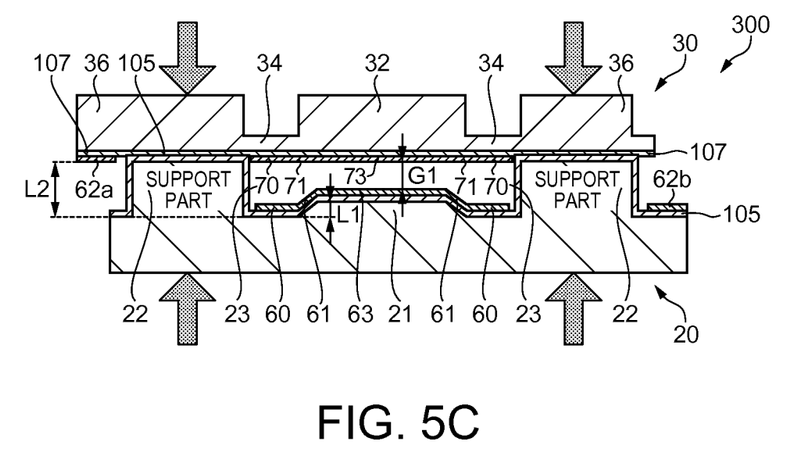

Next, a bonding process of the first substrate and the second substrate will be explained. FIGS. 5A to 5C show an example of a bonding process of the first substrate and the second substrate. At a step of FIG. 5A, to provide activation energy to the plasma-polymerized film (for example, the film consisting primarily of polyorganosiloxane) as the second bonding film 107 formed on the second substrate 30, $O_2$ plasma treatment or UV treatment is performed. The $O_2$ plasma treatment is performed for 30 seconds under the condition that $O_2$ flow is 30 cc/min, pressure is 27 Pa, and RF power is 200 W. Further, the UV treatment is performed for three minutes, for example, using excimer UV (wavelength 172 nm) as a UV light source.

At a step of FIG. 5B, to provide activation energy to the plasma-polymerized film (for example, the film consisting primarily of polyorganosiloxane) as the first bonding film 105 formed on the first substrate 20, $O_2$ plasma treatment or UV treatment is performed. The treatment conditions are the same as the above described conditions.

At a step of FIG. 5C, the first substrate 20 and the second substrate 30 that have been provided with activation energy are oppositely placed, alignment of the respective substrates is performed, and the respective substrates 20, 30 are superimposed and loads are applied thereon. In FIG. 5C, the loads are shown by black arrows. In this regard, active bonds (dangling bonds) of the first bonding film 105 and the second bonding film 107 after provision of activation energy are bound, and thereby, the first bonding film 105 and the second bonding film 107 are strongly bonded. In this manner, the bonding (fixing) between the first substrate 20 and the second substrate 30 is completed. Note that, subsequently, steps of dividing the respective chips may be provided.

In the example of the manufacturing method of the embodiment shown in FIGS. 5A to 5C, the structure that "by the contact between the flat surfaces of the first bonding film 105 and the second bonding film 107, the support 22 of the first substrate 20 may stably support the second substrate 30 and slanting of the substrates may be suppressed" is realized.

Further, "since the first optical film 63, the second optical film 73, the first electrode 60, and the second electrode 70 have the same material quality, patterning is necessary only once and deterioration of the first bonding film 105 and the second bonding film 107 due to etching of resists and films may be suppressed" is realized.

As described above, according to the manufacturing method of the variable-gap etalon filter as the light filter according to the embodiment, the following advantage may be obtained in addition to the advantages in embodiment 1.

In the comparative examples shown in FIGS. 9A to 9J, 10A to 10E, and 11A and 11B, since the materials of the electrodes and the optical films are different, material film formation and patterning of the materials are performed twice. On the other hand, in the example of the manufacturing process of the embodiment shown in FIGS. 3A to 3H and 4A to 4E, the materials of the electrodes and the optical films are the same, and therefore, film formation and patterning are necessary only once. Accordingly, the loads in the processes of manufacturing the respective substrates may be reduced.

Embodiment 3

Figure 6A:
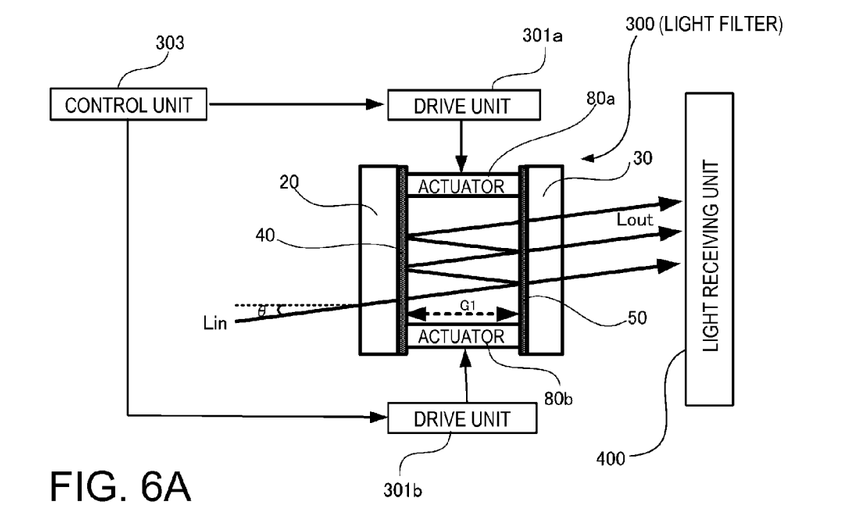
FIGS. 6A and 6B show an example of a structure of a light filter using a variable-gap etalon filter according to embodiment 3.
Figure 6B:
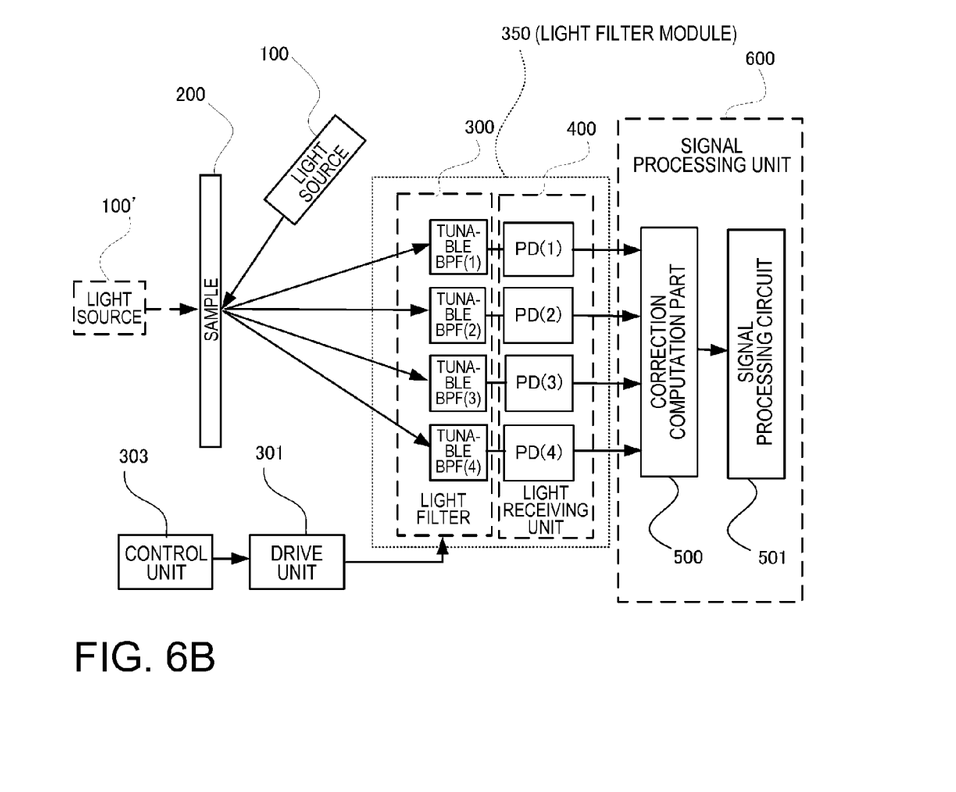

FIGS. 6A and 6B show an example of a structure of a light filter using a variable-gap etalon filter. As shown in FIG. 6A, the light filter 300 has the first substrate (for example, fixed substrate) 20 and a second substrate (for example, movable substrate) 30 oppositely placed to each other, the first optical film 63 provided on the first bonding film 105 of the first substrate 20, the second optical film 73 provided on the second bonding film 107 of the second substrate 30, actuators (for example, electrostatic actuators, piezoelectric devices, or the like) 80a, 80b sandwiched by the respective substrates for adjustment of the gap (distance) between the respective substrates.

Note that at least one of the first substrate 20 and the second substrate 30 may be the movable substrate, and both of them may be movable substrates. The actuator 80a and the actuator 80b are driven by a drive unit (drive circuit) 301a and a drive unit (drive circuit) 301b, respectively. Further, the operation of the respective drive units (drive circuits) 301a, 301b is controlled by a control unit (control circuit) 303.

Light Lin entering from the outside at a predetermined angle θ passes through the first optical film 63 with no significant scattering. Reflection of light is repeated between the first optical film 63 provided on the first substrate 20 and the second optical film 73 provided on the second substrate 30, and thereby, light interference occurs and only lights having wavelengths that satisfy a specific condition are intensified, and intensified parts of the lights having the wavelengths pass through the second optical film 73 on the second substrate 30 and reach a light receiving unit (light receiving device) 400. The wavelengths of the lights that intensify each other depend on the gap G1 between the first substrate 20 and the second substrate 30. Accordingly, by variably controlling the gap G1, the wavelength band of the lights to pass through may be changed.

Using the variable-gap etalon filter, a spectrometric instrument as shown in FIG. 6B may be formed. Note that, as examples of the spectrometric instrument, for example, there are a colorimeter, a spectroscopic analyzer, a spectroscopic spectrum analyzer, etc. In the spectrometric instrument shown in FIG. 6B, for example, a light source 100 is used when colorimetry of a sample 200 is performed and a light source 100' is used when spectroscopic analysis is performed.

The spectrometric instrument has the light source 100 (or 100'), the light filter (spectroscopic unit) 300 including plural tunable bandpass filters (tunable BPF (1) to tunable BPF (4)), the light receiving unit 400 including light receiving devices PD (1) to PD (4) such as photodiodes, a signal processing unit 600 that obtains a spectrophotometric distribution or the like by executing given signal processing based on light reception signals (light amount data) obtained from the light receiving unit 400, the drive unit 301 that respectively drives the respective tunable BPF (1) to tunable BPF (4), and the control unit 303 that variably controls the respective spectroscopic bands of the tunable BPF (1) to the tunable BPF (4). The signal processing unit 600 has a signal processing circuit 501, and may be provided with a correction computation part 500 according to need. By measurement of the spectrophotometric distribution, for example, colorimetry of the sample 200, component analysis of the sample 200, or the like may be performed. Further, as the light source 100 (100'), for example, an incandescent bulb, a fluorescent lamp, a discharge tube, a light source (solid-state light emitting device light source) using a solid-state light emitting device such as an LED or the like may be used.

Note that the light filter 300 and the light receiving unit 400 form a light filter module 350 as an optical device. The light filter module 350 may be applied to the spectrometric instrument, and, in addition, may be used as a light receiving unit (including a light reception optics and a light receiving device) of a light communications device, for example. This will be described later using FIG. 7.

As described above, according to the light filter module 350 according to the embodiment, in addition to the advantages in embodiment 1, there are advantages that the property degradation of the optical films may be suppressed, the reliability is high, the wavelength range of transmission light may be taken wider, the size and weight are reduced, and user-friendliness is provided.

Embodiment 4

Figure 7:
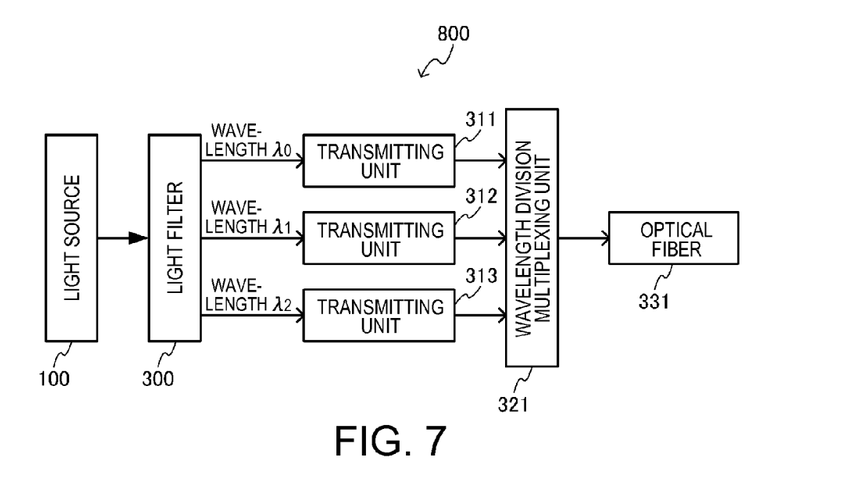
FIG. 7 is a block diagram showing a schematic configuration of a transmitter of a wavelength division multiplexing communication system according to embodiment 4.

FIG. 7 is a block diagram showing a schematic configuration of a transmitter of a wavelength division multiplexing communication system. In wavelength division multiplexing (WDM) communication, if plural light signals having different wavelengths are used in a multiplexing manner within one optical fiber utilizing the characteristic that signals having different wavelengths do not interfere with each other, the amount of data transmission may be improved without increasing the lines of optical fibers.

In FIG. 7, a wavelength division multiplexing transmitter 800 as an optical device has the light filter 300 to which light from the light source 100 enters, and lights having plural wavelengths λ0, λ1, λ2, . . . are transmitted through the light filter 300 (including the etalon filter employing any one of the mirror structures). Transmitting units 311, 312, 313 are provided with respect to each wavelength. Light pulse signals for plural channels from the transmitting units 311, 312, 313 are combined into one in a wavelength division multiplexing unit 321 and sent out to one optical fiber transmission path 331.

The invention may be similarly applied to an optical code division multiplexing (OCDM) transmitter. The OCDM identifies channels by pattern matching of coded light pulse signals because light pulses of the light pulse signals contain light components having different wavelengths.

As described above, according to the wavelength division multiplexing transmitter 800 according to the embodiment, in this manner, by applying the invention to an optical device, an optical device (for example, various kinds of sensors and optical communication applied devices) with suppressed property degradation of optical films and highly reliability is realized.

The entire disclosure of Japanese Patent Application No. 2010-245979, Nov. 2, 2010 filed is expressly incorporated by reference herein.

What is claimed is:

1. A light filter comprising:
a first substrate having a support part;
a second substrate supported by the support part;
a first bonding film provided in an entire region at the second substrate side of the first substrate;
a second bonding film provided in an entire region at the first substrate side of the second substrate;
a first optical film provided on the first bonding film of the first substrate;
a second optical film provided on the second bonding film of the second substrate and oppositely placed to the first optical film;
a first electrode provided on the first bonding film of the first substrate; and
a second electrode provided on the second bonding film of the second substrate and oppositely placed to the first electrode,
wherein the first substrate and the second substrate are fixed by bonding of the first bonding film and the second bonding film to one another at the support part, and
the first optical film, the second optical film, the first electrode, and the second electrode are formed of the same material.

2. The light filter according to claim 1, wherein a first wiring line connecting the first optical film and the first electrode is provided on the first substrate.

3. The light filter according to claim 2, wherein a second wiring line connecting the second optical film and the second electrode is provided on the second substrate.

4. The light filter according to claim 3, wherein a material of the first optical film, the second optical film, the first electrode, the second electrode, the first wiring line, and the second wiring line is any one of silver (Ag) alloy, silver (Ag), aluminum (Al), chromium (Cr), copper (Cu), nickel (Ni), platinum (Pt), and rhodium (Rh).

5. An optical device comprising the light filter according to claim 4.

6. The light filter according to claim 3, wherein a material of the first optical film, the second optical film, the first electrode, the second electrode, the first wiring line, and the second wiring line is an alloy formed by selecting two or more kinds of materials of silver (Ag) alloy, silver (Ag), aluminum (Al), chromium (Cr), copper (Cu), nickel (Ni), platinum (Pt), and rhodium (Rh).

7. An optical device comprising the light filter according to claim 6.

8. The light filter according to claim 3, wherein the first wiring line and the second wiring line are the same material as the first electrode.

9. An optical device comprising the light filter according to claim 8.

10. An optical device comprising the light filter according to claim 3.

11. An optical device comprising the light filter according to claim 2.

12. The light filter according to claim 1, wherein a concave part is provided at the second substrate side of the first substrate, a convex part projecting from a bottom surface of the concave part is provided in the concave part, and the convex part is provided in an island shape in the concave part, and
a sectional shape in the convex part takes a trapezoidal shape, a lower base of the trapezoidal shape being the bottom surface of the concave part.

13. An optical device comprising the light filter according to claim 12.

14. An optical device comprising the light filter according to claim 1.

15. A manufacturing method of a light filter including a first substrate having a support part and a second substrate supported by the support part and formed by bonding a first bonding film formed at the support part and a second bonding film formed on the second substrate and fixing the first substrate and the second substrate, the method comprising:
manufacturing a first substrate including
forming a concave part with the support part of the first substrate as an outer periphery,
forming an island-shaped convex part in the concave part,
forming the first bonding film on a surface containing the support part, the concave part, and the convex part in the first substrate,
forming a first optical film and a first electrode using the same material on the first bonding film, and
activating the first bonding film;
manufacturing a second substrate including
forming the second bonding film on a surface of the second substrate,
forming a second optical film and a second electrode using the same material on the second bonding film, and
activating the second bonding film; and
fixing the first substrate and the second substrate by second bonding film to one another at the support part by applying a load on at least one of the first second bonding by applying a load on at least one of the first substrate and the second substrate with the first substrate facing to the second substrate.

16. The manufacturing method of the light filter according to claim 15, wherein, at the forming of the first optical film and the first electrode on the first bonding film, a first wiring line connecting the first optical film and the first electrode is formed in the same step.

17. The manufacturing method of the light filter according to claim 15, wherein at the forming of the second optical film and the second electrode on the second bonding film, a second wiring line connecting the second optical film and the second electrode is formed in the same step.

* * * * *